United States Patent
Owen et al.

(10) Patent No.: US 6,658,596 B1
(45) Date of Patent: Dec. 2, 2003

(54) AUTOMATED QUEUE RECOVERY USING ELEMENT-BASED JOURNALING

(75) Inventors: David Finian Owen, Rochester, MN (US); Ruth Janine Poole, Rochester, MN (US); Larry William Youngren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,750

(22) Filed: Mar. 13, 2000

(51) Int. Cl.⁷ .............................................. G06F 11/14
(52) U.S. Cl. ........................................................ 714/16
(58) Field of Search ............................. 714/19, 16, 17; 707/202

(56) References Cited

U.S. PATENT DOCUMENTS

| | | | |
|---|---|---|---|
| 4,819,156 A | | 4/1989 | DeLorme et al. ............ 364/200 |
| 5,369,757 A | * | 11/1994 | Spiro et al. .................... 714/19 |
| 5,452,430 A | | 9/1995 | Dievendorff et al. .. 395/183.13 |
| 6,105,148 A | * | 8/2000 | Chung et al. ................. 714/16 |
| 6,119,129 A | * | 9/2000 | Traversat et al. ............ 707/202 |
| 6,253,212 B1 | * | 6/2001 | Loaiza et al. ................ 707/202 |
| 6,493,826 B1 | * | 12/2002 | Schofield et al. ........... 713/200 |

FOREIGN PATENT DOCUMENTS

JP 406348583 A * 12/1994 ........... G06F/12/02

* cited by examiner

*Primary Examiner*—Scott Baderman
(74) *Attorney, Agent, or Firm*—Wood, Herron & Evans, LLP

(57) ABSTRACT

An apparatus, program product and method manage a queue through the use of element-based journaling to record changes made to logical elements in a queue. In contrast to convention memory-based journaling, where any changes to the memory representing an element in a queue are journaled, only those operations that affect the logical ordering and/or placement of an element on a queue, or the logical contents of such an element, are journaled. Memory management operations such as pointer manipulation operations that modify pointers or other memory management data, but do not otherwise modify the actual elements in a queue or their relative ordering, need not be journaled. As a consequence, the storage and processing overhead associated with journaling may be substantially reduced, thereby substantially reducing the overhead associated with maintenance and recovery of a queue.

30 Claims, 8 Drawing Sheets

AUTOMATED QUEUE RECOVERY USING ELEMENT-BASED JOURNALING

FIELD OF THE INVENTION

The invention is generally directed to fault tolerance and automated recovery of a computer in response to an abnormal termination, and in particular, to automated recovery of a queue implemented in the same.

BACKGROUND OF THE INVENTION

As the world becomes increasingly reliant upon the computer retrieval and processing of data, the integrity of the systems safeguarding that data has become paramount. Computers are used in many mission-critical applications where interruption or failure of a computer is intolerable. Given the pervasive dependency of society on computers, any interruptions, corruptions or crashes caused by power failures, faulty operations or programming errors can have devastating implications. From world financial markets to the transportation industry, the seamless recovery of processes from potentially crippling terminations is critical. For these reasons, considerable efforts have been devoted to ensuring the preservation and recoverability of vital, computer-stored information.

One area of particular criticality pertains to the reliable maintenance and recovery of computer queues. Generally, a queue is a type of first-in, first-out (FIFO) data structure for holding multiple elements of information that supports two primary operations, an enqueue operation for adding an element to the queue, and a dequeue operation for removing the oldest element (i.e., the element that was placed on the queue before any other elements currently in the queue) from the queue.

One application of a queue, for example, is in storing an ordered list of messages to be communicated between computer processes or jobs executing on a computer. Often message queues are incorporated into low-level communication mechanisms to facilitate communications between concurrently executing computer processes. In such applications, any process that wishes to convey information to another process generates an appropriate message and invokes the communication mechanism to enqueue the message on a message queue that is accessible by the recipient process for the message. Then, the recipient process is permitted to receive the message by invoking the communication mechanism to dequeue the message from the message queue. Given the FIFO nature of a queue, multiple messages may be added to the queue, and will be maintained in their proper sequence until the recipient process is able to remove all of the messages from the queue.

The messages stored in a queue are often stored in a linked-list data structure, where each message has a pointer to the next message in the queue, so that a particular message in a queue may be located by following the chain of pointers between the messages in the linked-list until the desired message is found. Following a long chain of pointers, however, can be time consuming, and as such, in some performance-critical applications, keyed data structures such as trees are used to improve performance. With a tree data structure for a queue, messages are associated with keys, and sorted hierarchically based on their keys. The keys are used to traverse through the tree to locate a specific message meeting a specific condition. Multiple paths are defined through the data structure so that less steps are typically required to traverse a tree to locate a specific message. To optimize the performance of a tree, often the tree is balanced, such that messages are resorted in the data structure to minimize the distance from the root of the tree to each leaf. Often, when pointers are used to connect the different messages in a tree, such reordering requires only that the pointers between messages be updated.

Recovery of message queues is often desirable to permit a computer to recover from an abnormal termination, in particular, to ensure that no messages that were stored in the queue are lost prior to delivery to their intended destinations. However, message queues and the like present a number of unique maintenance and recovery problems that are not adequately addressed by conventional computer recovery techniques.

For example, some computer designs have attempted to store back-up files of nearly every computer message and operation executed on a particular operating system. However, doing so often exceeds the storage capacity of a computer and places an immense burden on the processing capability of the computer, resulting in severe performance degradation. Other designs reduce such overhead by storing only key diagnostic parameters to a journal for the purpose of recovering memory such as database information. A journal in such an application typically includes a record of changes that have been made to particular segments of memory since those segments were last written to nonvolatile storage (e.g., an external direct access storage device (DASD)). The contents of a journal are also typically saved in nonvolatile storage, such that, upon failure, a segment of memory can be recovered by retrieving the last copy of the segment from nonvolatile storage and applying the relevant journal entries to in effect regenerate the changes that occurred to the segment.

While such methods often provide sufficient safeguards for certain types of computer information, such methods are typically inadequate for use in protecting queued message data. In particular, queue operations often entail frequent pointer manipulation operations, and any attempts to record or journal all of such operations would impose significant storage and processing overhead.

Therefore, a significant need exists for an improved manner of maintaining computer queues, in particular so as to facilitate the automatic recovery of corrupted queues in fault tolerant and other mission-critical applications.

SUMMARY OF THE INVENTION

The invention addresses these and other problems associated with the prior art in providing an apparatus, program product and method in which a queue is maintained and recovered utilizing element-based journaling to record changes made to logical elements in a queue. Consequently, in contrast to conventional memory-based journaling, where any changes to the memory representing an element in a queue would be journaled, only those operations that affect the logical ordering and/or placement of an element on a queue, or the logical contents of such an element need be journaled. Often, memory management operations such as pointer manipulation operations that modify pointers, but do not otherwise modify the actual elements in a queue or their relative ordering, need not be journaled. As a consequence, the storage and processing overhead associated with journaling maybe substantially reduced, thereby substantially reducing the overhead associated with maintenance and recovery of a queue.

Therefore, the invention provides in one aspect a method, apparatus and program product for managing a queue in a computer, in which a persistent representation of a queue is stored in nonvolatile memory, at least one logical operation performed on the queue is journaled subsequent to storing the persistent representation of the queue, and the queue is recovered by retrieving the persistent representation of the queue from nonvolatile memory and applying the journaled logical operation to the queue.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize element-based journaling to facilitate the automated recovery of a queue data structure in a computer. Through the use of element-based journaling, typically only operations that result in the logical ordering and/or placement of an element on a queue, or the logical contents of such an element, are journaled (hereinafter referred to as logical operations), in contrast to memory-based journaling whereby any changes to the data on a page or segment of memory (e.g., in the case of a message queue, changes to pointers and other memory management data, etc.) are journaled. Put another way, only operations that modify the logical organization of the queue and/or its elements, are journaled, while non-logical operations, e.g., memory management, pointer manipulation, and other operations that do not affect the logical organization of the queue or any element, are not journaled. As such, the storage and performance impacts of element-based journaling are substantially reduced as compared to memory-based journaling.

In the embodiments described below, element-based journaling is utilized in conjunction with a message queue provided for the purpose of facilitating inter-process communication in a computer, whereby the logical elements in the queue are messages being transmitted between different computer processes. While the term "message" will hereinafter be utilized to describe the logical elements within a message queue, it will be appreciated by those of ordinary skill in the art having the benefit of the instant disclosure that other logical elements may be utilized in a recoverable queue consistent with the invention.

Figure 1:
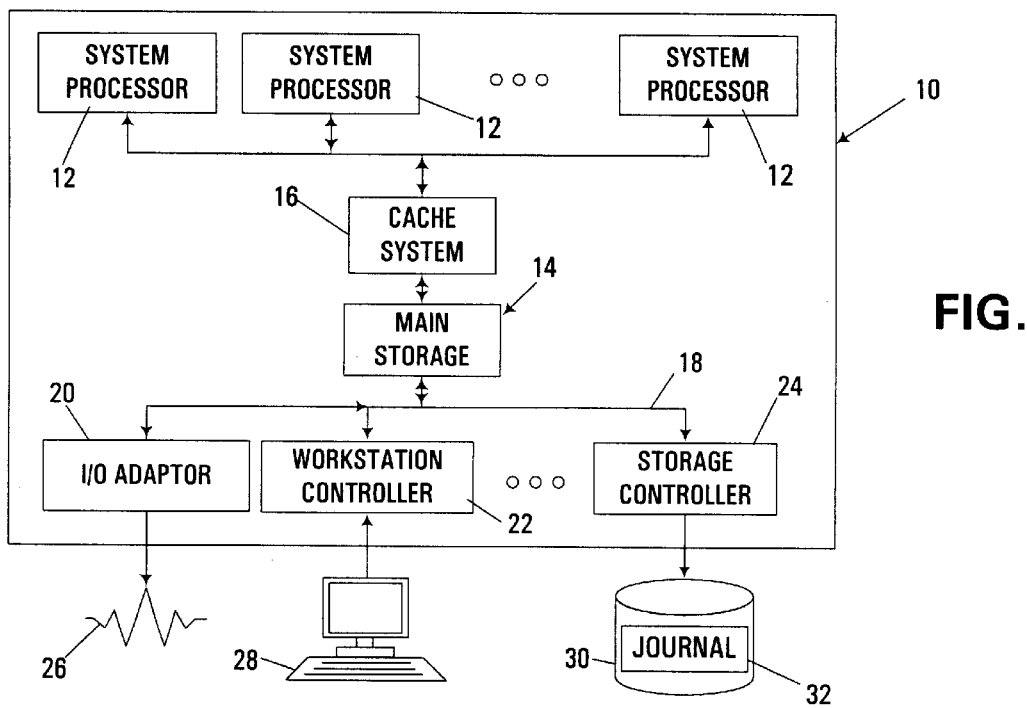
FIG. 1 is a block diagram of a computer incorporating a recoverable message queue consistent with the invention.

Turning to the Drawings, wherein like numbers denote like parts throughout the several views, FIG. 1 illustrates the general configuration of an exemplary computer 10 suitable for implementing a recoverable message queue consistent with the invention. System 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Computer 10 generally includes one or more system processors 12 coupled to a main storage through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks 26, one or more workstations 28, and/or one or more storage devices such as a direct access storage device (DASD) 30. Illustrated within DASD 30 is a journal 32 used to record the state of a message queue consistent with the invention.

Figure 2:
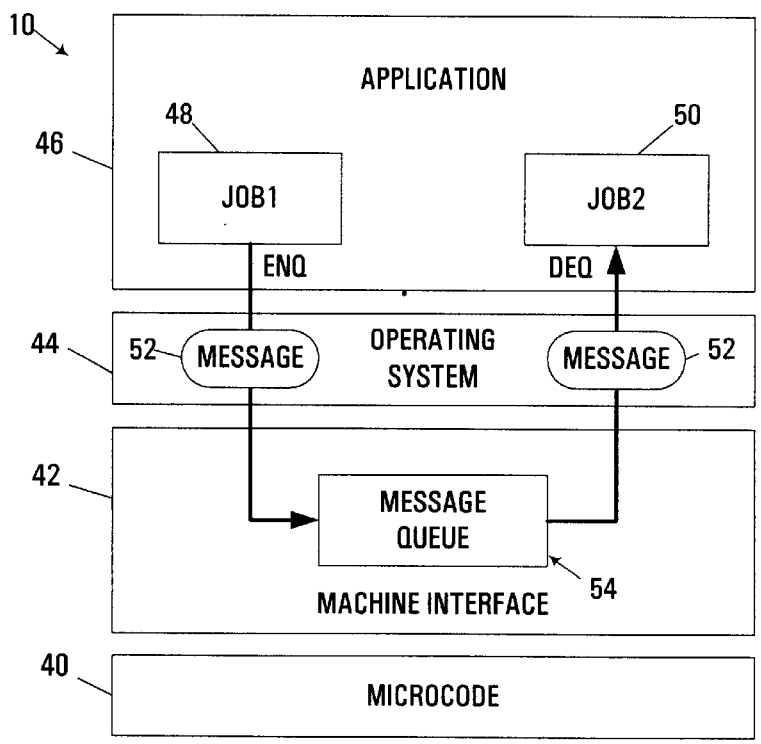
FIG. 2 is a block diagram of the primary software components utilized in passing messages between jobs in the computer of FIG. 1.

FIG. 2 next illustrates one specific application of element-based journaling consistent with the invention, specifically for use in the automated recovery of a message queue utilized in passing messages between multiple jobs or processes in computer 10. In this embodiment, computer 10 is implemented as an AS/400 midrange computer available from International Business Machines Corporation, incorporating machine-dependent microcode 40, a machine-independent machine interface 42, an operating system 44 and one or more applications 46, the use and configuration of which are generally understood in the art. In an AS/400 computer, any application 46 is capable of executing one or more jobs, e.g., jobs 48 and 50, and jobs are permitted to communicate with one another through the messaging service generally illustrated in FIG. 2. The messaging service is primarily implemented within a message queue object 54, which operates as a first-in first-out (FIFO) buffer that forwards messages between a sending job to a receiving job under the control of such jobs. Specifically, a message is sent by a sending job by performing an enqueue (ENQ) operation to forward a message for inclusion on message queue 54. A receiving job receives a message in a converse manner, typically by performing a dequeue (DEQ) operation to initiate forwarding of the first message 52 on the message queue 54 to the receiving job 50.

It will be appreciated that the general usage of message queues and the like in various computer environments is well known in the art. Moreover, while the hereinafter-described embodiment focuses on the application of a message queue in performing inter-process communication on an AS/400 computer, it will be appreciated that the invention may be utilized in a wide variety of other applications and environments. Thus, the invention is not limited to the particular implementations described herein.

To support the automated recovery of a queue consistent with the invention, message queue 54 supports a number of services for use in creating, maintaining, recovering and otherwise controlling the message queue 54. Most notably, message queue 54 supports a create queue operation (utilized to instantiate a new queue), a start journaling operation (utilized to initiate journaling of an existing message queue), an enqueue operation (utilized to add a message to the message queue), a dequeue operation (utilized to remove a message from the message queue), and a recover queue operation (utilized to recover a queue after an abnormal termination). Additional operations and functionality may also be supported by message queue 54, as will be apparent to one of ordinary skill in the art having the benefit of the instant disclosure.

The discussion hereinafter will focus on the specific routines utilized to implement the above-described functionality. Moreover, in conjunction with such a discussion, the manipulation of an exemplary message queue data structure is described to facilitate a better understanding of the operation of the described embodiment. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular a program nomenclature that follows is used merely for convenience, and thus the invention should not be limited to use solely in any specific application identified and/or implied by such nomenclature.

Figure 3:
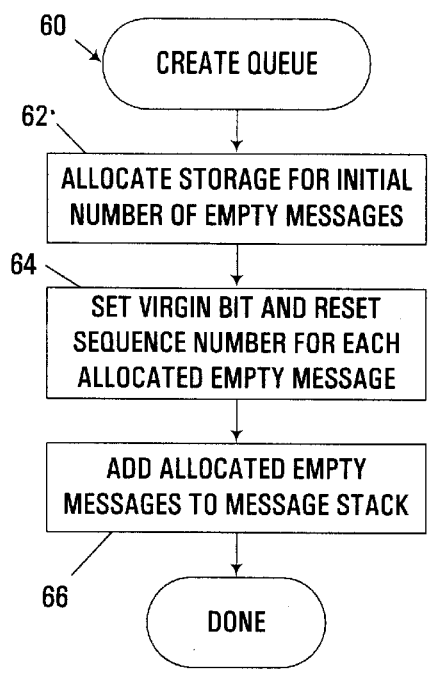
FIG. 3 is a flowchart illustrating a create queue routine supported by the message queue of FIG. 2.

Support for a create queue operation is provided by a create queue routine 60 shown in FIG. 3. Routine 60 begins in block 62 by allocating storage for an initial number of empty messages. In particular, an initial quantity of message records may be specified by a user or provided as a default, with the storage required to store the data in the format defined for each message record allocated in memory, typically on a segment-by-segment basis.

Each message record includes a virgin bit and a sequence number that is utilized in element-based journaling consistent with the invention. The virgin bit indicates whether a message has not been modified since the last sync point, which is the last point at which all of the operations on the journal were applied to the persistent copy of the queue in nonvolatile memory. The sequence number identifies the relative position in the sequence of messages in the message queue. It will be appreciated that any other form of identifier that may be utilized to sort messages based upon the order in which the messages are added to a message queue may be used in the alternative. In this implementation, the sequence number stored in each message record is set to zero if the message is empty or otherwise not in use. A separate "in use" indicator may be used in the alternative.

Block 64 therefore sets the virgin bit and resets the sequence number for each allocated empty message to indicate that each message is in a virgin state and is not disposed on the message queue. Block 66 next adds each allocated empty message to a message stack, which is typically implemented as a linked list of empty message records through which allocated memory may be quickly obtained for adding a message to the message queue. Upon completion of block 66, routine 60 is complete.

Figure 4:
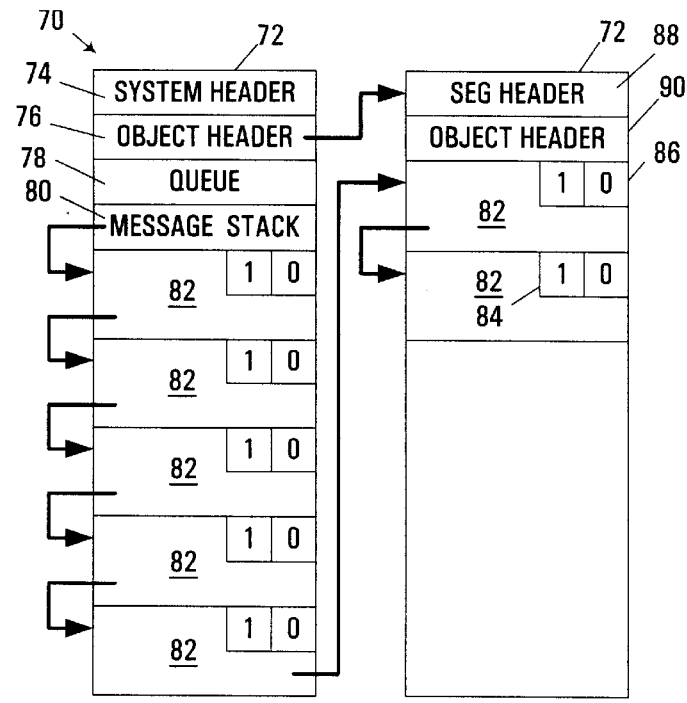
FIG. 4 is a block diagram of an exemplary message queue data structure subsequent to execution of the create queue routine of FIG. 3.

As shown in FIG. 4, for example, a message queue data structure 70 is illustrated in a state subsequent to creation of a queue via routine 60. In the illustrated implementation, data structure 70 includes one or more memory segments 72 representing the allocated memory for the message stack. A first segment 72 typically includes organizational information disposed at the head of the segment, including, for example, a system header 74 storing various system information for the message queue, an object header 76 storing additional queue-specific information, including a pointer to the next segment in a linked list of segments representing the message queue, a queue pointer 78 representing the head of the queue of message records, and a message stack pointer 80 representing the head of the stack of empty message records available for the queue. It may be seen that, after allocation of memory for the empty messages and placing the messages on the message stack, a linked list of empty message records 82 are stored in data structure 70, and accessible via message stack pointer 80. Also illustrated are a virgin bit 84 and a sequence number 86 for each such empty message record.

It may be seen that when the number of empty message records exceeds the allocated space in a segment, additional message records 82 are disposed in a subsequent segment 72, with such subsequent segments including a segment header 88 storing information specific to the segment, as well as an object header 90 including queue identification information as well as a pointer to subsequent segments, such that a linked list of segments is provided by following the pointers in the object headers within the segments.

Figure 5:
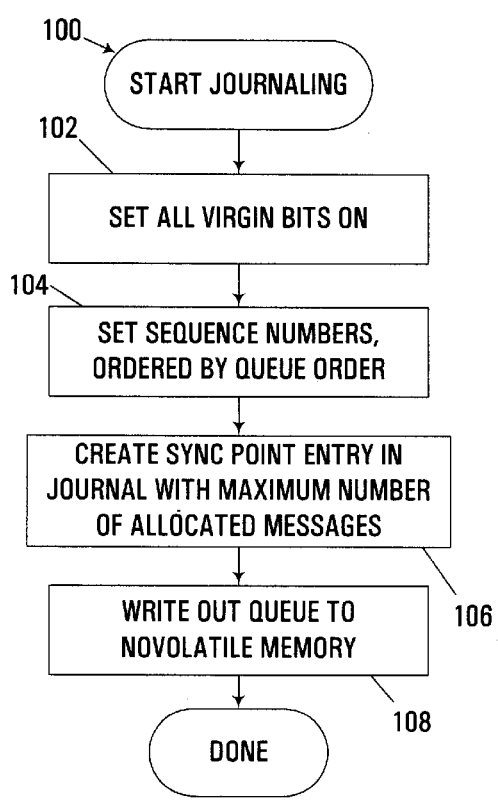
FIG. 5 is a flowchart illustrating a start journaling routine supported by the message queue of FIG. 2.

In the illustrated implementation, journaling of a message queue is a user-selected operation—that is, if a program developer wishes to journal a queue, the program developer must initiate a start journaling operation to initiate journaling of the queue. A start journaling routine 100 suitable for performing such operation is illustrated in FIG. 5. It will be appreciated, however, that journaling of a message queue may be performed automatically, whereby routine 100 may be executed immediately subsequent to creation of the queue using routine 60.

Routine 100 begins in block 102 by setting the virgin bit for each message record in the message queue. Next, block 104 sets the sequence number in each of the message records, ordered by the order in which the message records are added to the queue. Next, in block 106, a sync point entry is created in a journal, storing the maximum number of allocated messages in the message queue data structure.

Next, in block 108, the contents of the queue are written out to non-volatile memory (e.g., to DASD 30). Consequently, upon completion of routine 100, the journal has been updated to indicate that a sync point has been established, where a complete copy of the initial state of the queue has been written to non-volatile memory. Typically, such non-volatile memory is disk storage accessible via a storage device such as a DASD, although other forms of non-volatile memory, e.g., nonvolatile solid state memory, optical disk, etc. may also be used in the alternative.

Figure 6:
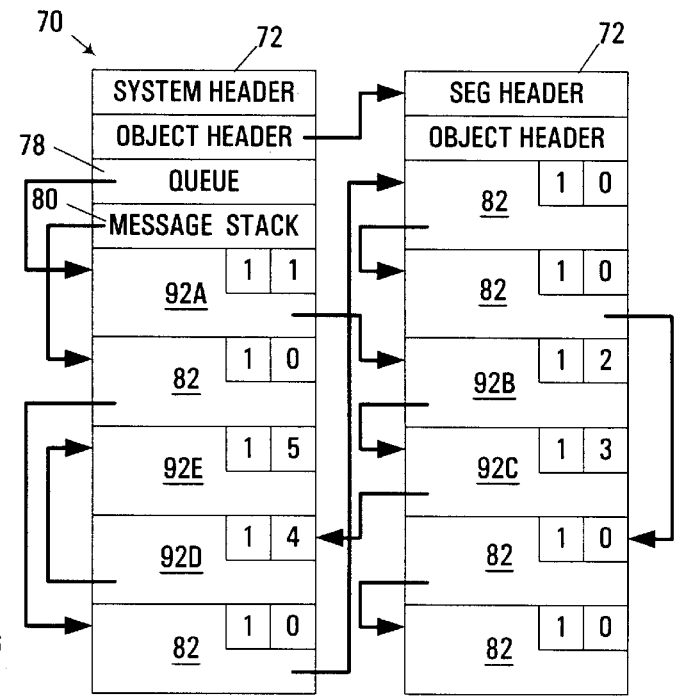
FIG. 6 is a block diagram of the exemplary message queue data structure of FIG. 4 subsequent to the enqueuing of several messages on the message queue and subsequent to execution of the start journaling routine of FIG. 5.

FIG. 6 illustrates the result of execution of routine 100 on exemplary data structure 70, and also subsequent to the enqueuing of several messages onto the message queue. As will be discussed in further detail below, enqueuing a message on the message queue typically includes removing an empty message record from the message stack, storing data specific to a message to be enqueued within the empty message record, and then appending the message onto the end of the queue, the head of which is pointed to by queue pointer 78. In the exemplary data structure of FIG. 6, for example, it may be seen that five messages, 92A–92E have been enqueued on the queue to form a linked list data structure whereby each message in the queue points to the next message that immediately follows such message in the queue. It may be seen that the virgin bits within each message in the queue are set to "1", and the sequence numbers for each of the messages are assigned in the order in which the messages were added to the queue.

Figure 7:
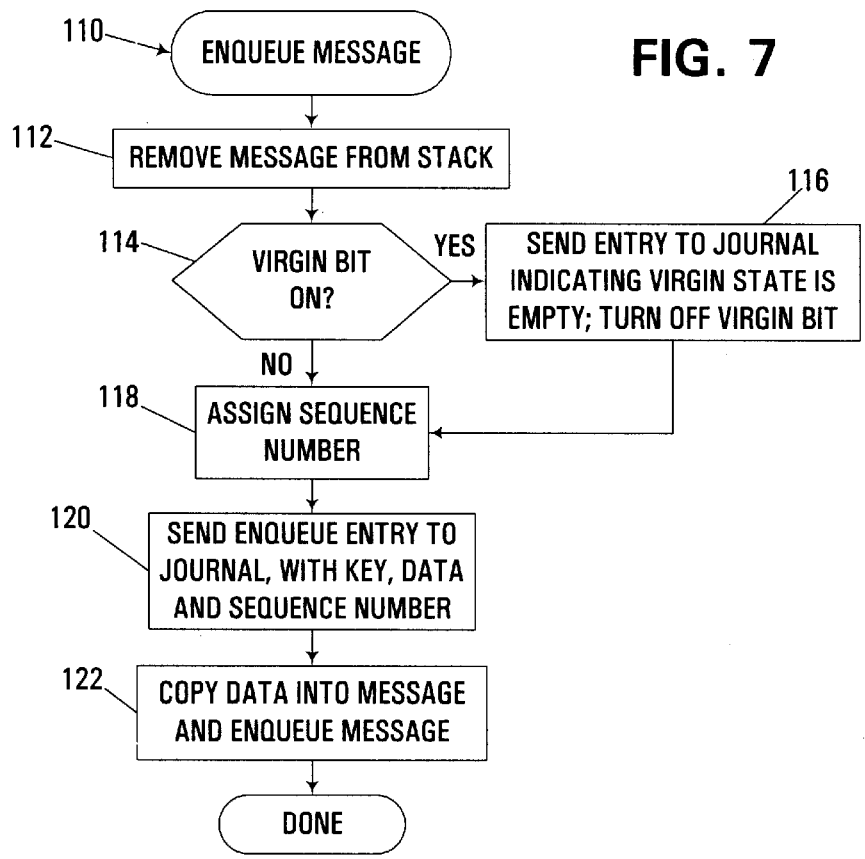
FIG. 7 is a flowchart illustrating an enqueue message routine supported by the message queue of FIG. 2.

Now turning to FIG. 7, the operations associated with enqueuing a message on the message queue are illustrated by enqueue message routine 110. Routine 110 begins in block 112 by removing an empty message from the message stack—typically by obtaining the pointer for the head message on the message stack from the message stack pointer, and then updating the message stack pointer to point to the next message on the stack pointed to by the removed message. Next, block 114 determines whether the virgin bit for the removed message is on. If it is, control passes to block 116 to send an entry to the journal indicating that the virgin state of the message is empty, i.e., the message has not been modified since the message was empty prior to enqueuing the message on the queue. In addition, the virgin bit for the message is turned off to indicate that the message is being modified.

Control next passes to block 118 to assign a sequence number to the message, typically by incrementing a counter that stores the sequence number for the last allocated message. Returning to block 114, if the virgin bit for the message is not on, block 116 is bypassed, and control passes directly to block 118 to assign a sequence number to the message.

Next, block 120 sends an enqueue entry to the journal, including the message data and sequence number for the message, as well as an optional key utilized to sort the queue if a keyed data structure (e.g., a tree) is utilized to represent the queue of message records. Next, block 122 copies the relevant message data into the message and enqueues the message on the queue.

As mentioned above, a queue may be implemented using any number of data structures. For example, a queue may simply be represented by a linked list data structure, whereby messages are simply appended to the end of a linked list when enqueued on the message queue, and messages are dequeued from the queue simply by removing the first message from the linked list. In other embodiments, however, alternate data structures may be used. For example, a tree data structure may be utilized whereby messages include keys that are utilized to facilitate searching of a particular message record within the queue.

Thus, for a linked list implementation of a queue, enqueuing a message on the queue in block 122 typically involves following the chain of pointers in the various message records on the queue until a last message is located, then inserting a pointer in the last message to point to the new message to be added to the queue. For a tree data structure, however, typically enqueuing a message on the queue incorporates a sort operation to "balance" the tree and minimize all paths within the data structure for maximum performance. It will be appreciated that other data structures may be utilized consistent with the invention.

Figure 8:
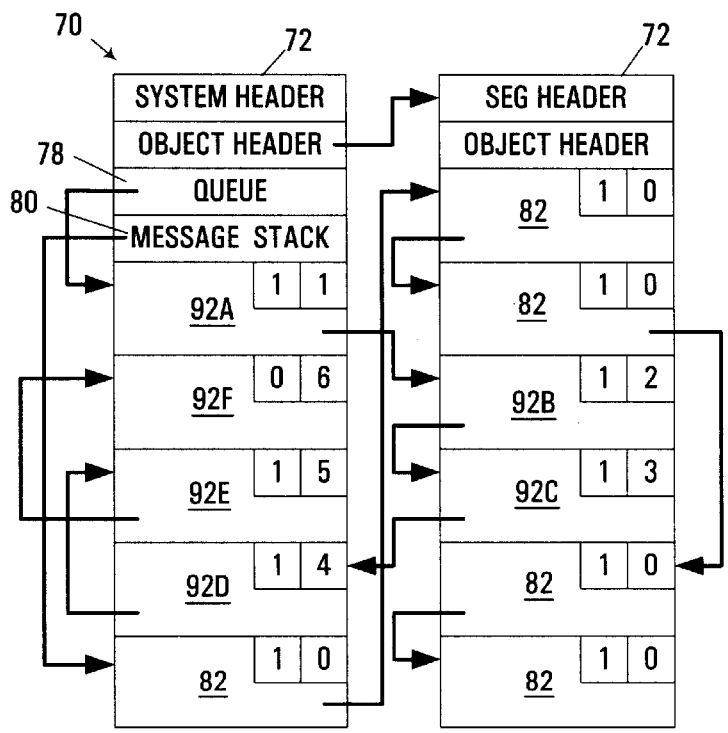
FIG. 8 is a block diagram of the exemplary message queue data structure of FIG. 6 subsequent to execution of the enqueue message routine of FIG. 7.

FIG. 8 illustrates the result of the execution of routine 110 on exemplary data structure 70. In this exemplary data structure, a linked-list representation of the queue is utilized, and as such, the addition of a new message 92F on the queue results in the addition of a pointer in the previous last message 92E that points to message 92F. In addition, the sequence number for the message is set to follow the previous last message on the queue, and the virgin bit is cleared to indicate that the message has been modified since the last sync point.

Figure 9:
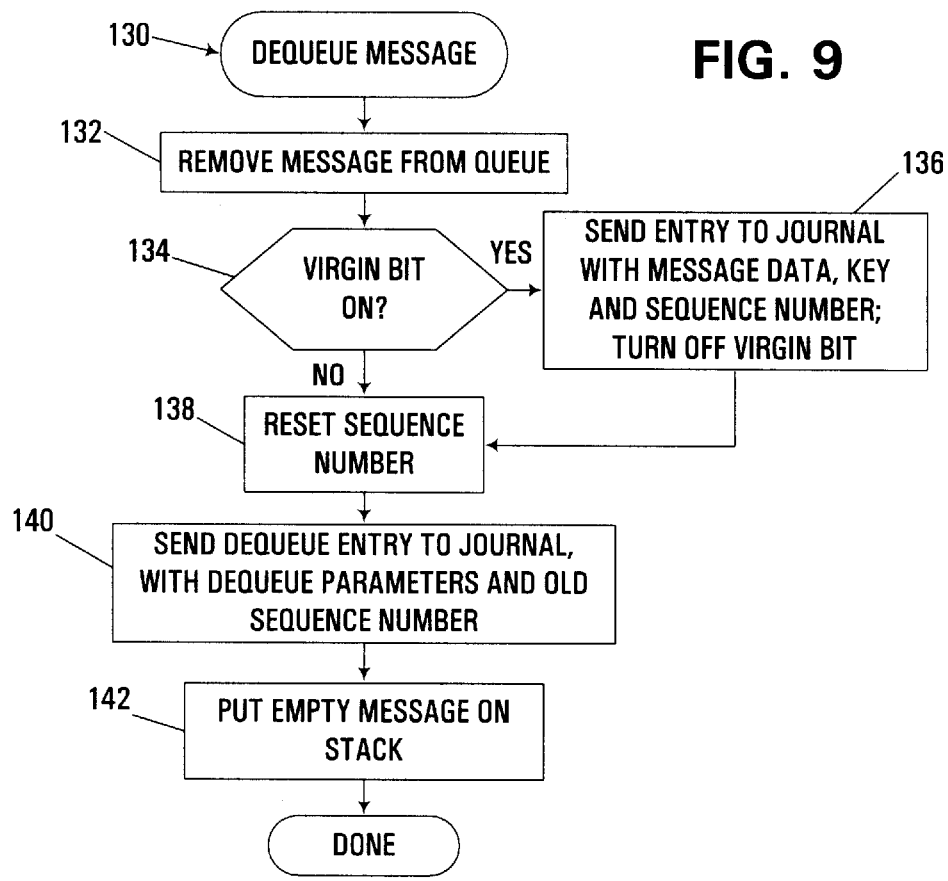
FIG. 9 is a flowchart illustrating a dequeue message routine supported by the message queue of FIG. 2.

FIG. 9 next illustrates the operations associated with dequeuing a message from the queue via a routine 130. Routine 130 begins in block 132 by removing the first message from the queue—typically in a linked list implementation by obtaining the queue pointer (which points to the first message in the queue) and updating the queue pointer to point to the next message in the linked list subsequent to the message being removed from the queue. For other data structures, including tree data structures, for example, the message may be searched by key, removed, and the remaining data structure resorted as appropriate.

Next, block 134 determines whether the virgin bit for the message is on. If it is, control passes to block 136 to send an entry to the journal including the message data, optional key and sequence number. In addition, the virgin bit is turned off for the message. Control then passes to block 138 to reset the sequence number to zero. Returning to block 134, if the virgin bit is not on, block 136 is bypassed, and control passes directly to block 138.

Next, block 140 sends a dequeue entry to the journal, including various dequeuing parameters and the old sequence number of the message being dequeued. Various dequeue parameters may be included in the entry, including, for example, the relationship of the message to a particular key. In the alternative, no dequeue parameters may be provided in the dequeue entry.

Next, block 142 puts the empty message on the stack—typically by storing the message stack pointer in the next message pointer for the new empty message, and updating the message stack pointer to point to the new empty message. Routine 130 is then complete.

Figure 10:
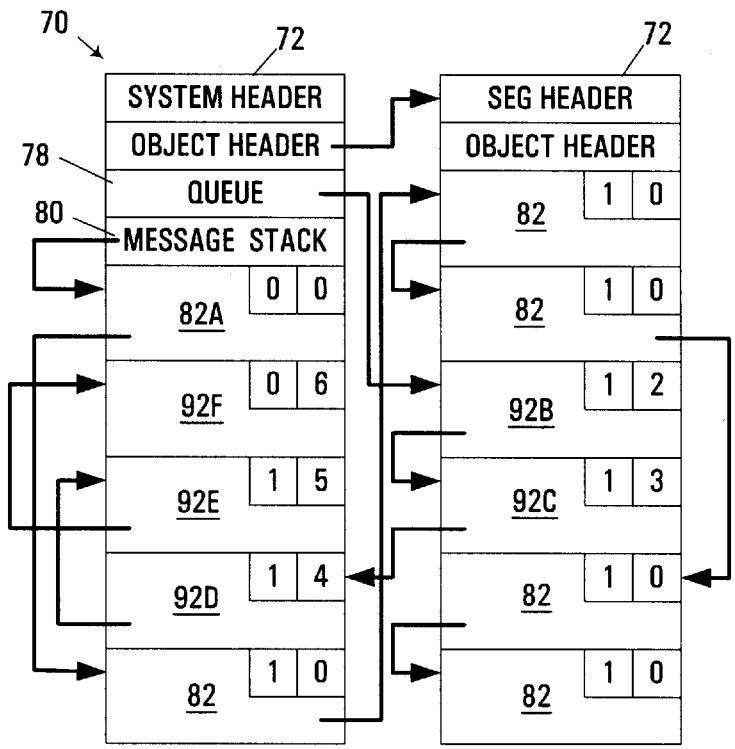
FIG. 10 is a block diagram of the exemplary message queue data structure of FIG. 8 subsequent to execution of the dequeue message routine of FIG. 9.

FIG. 10 next illustrates the result of the execution of routine 130 on exemplary data structure 70. In particular, it may be seen that queue pointer 78 has been updated to now point to message 92B with previous message 92A removed from the queue and inserted at the head of the message stack (and now represented as 82A). It is to be noted that the virgin bit, as well as the sequence number for the message 82A have been reset as a result of the execution of routine 130.

Figure 11A:
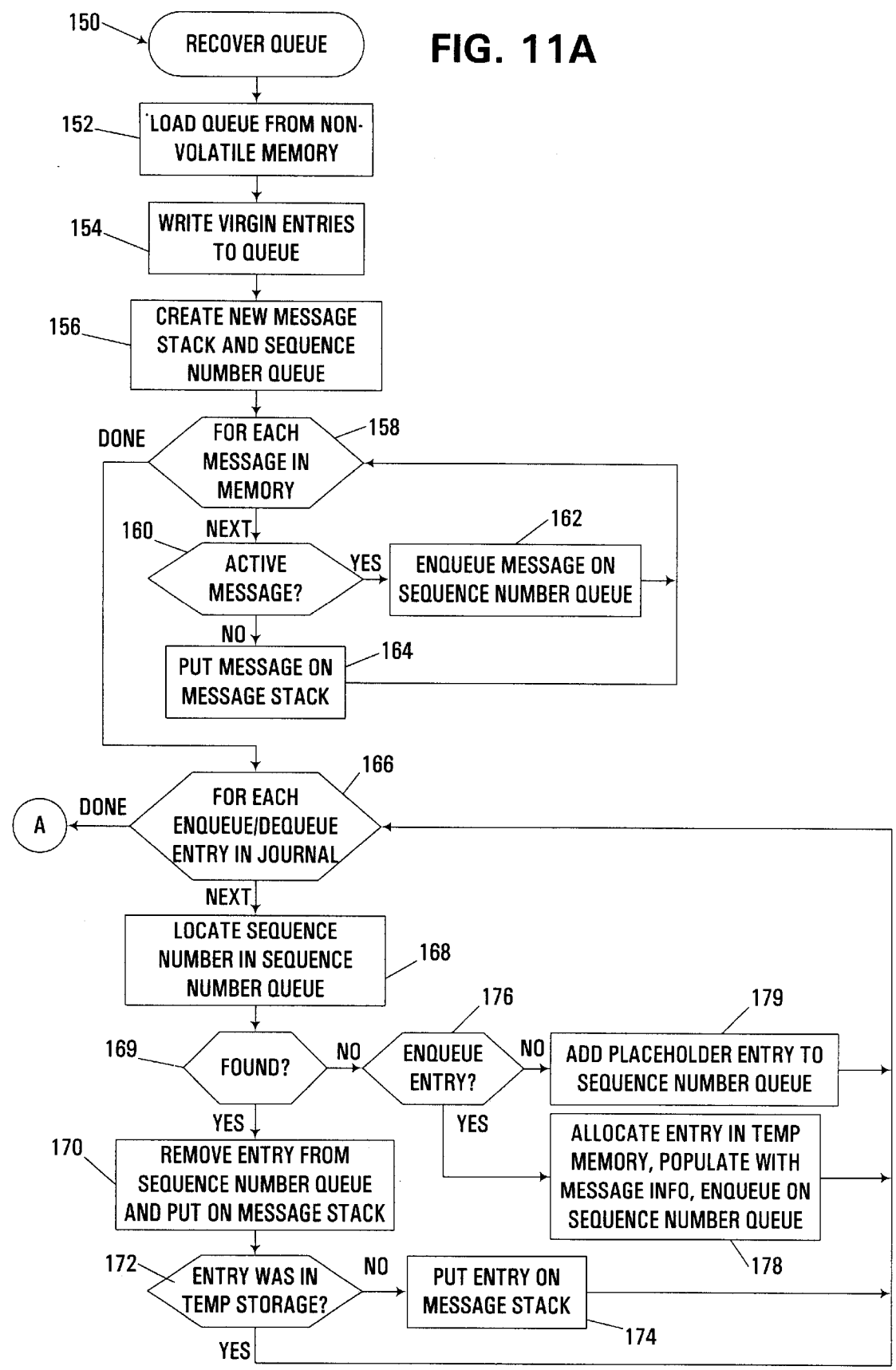
FIGS. 11A and 11B are flowcharts illustrating a recover queue routine supported by the message queue of FIG. 2.
Figure 11B:
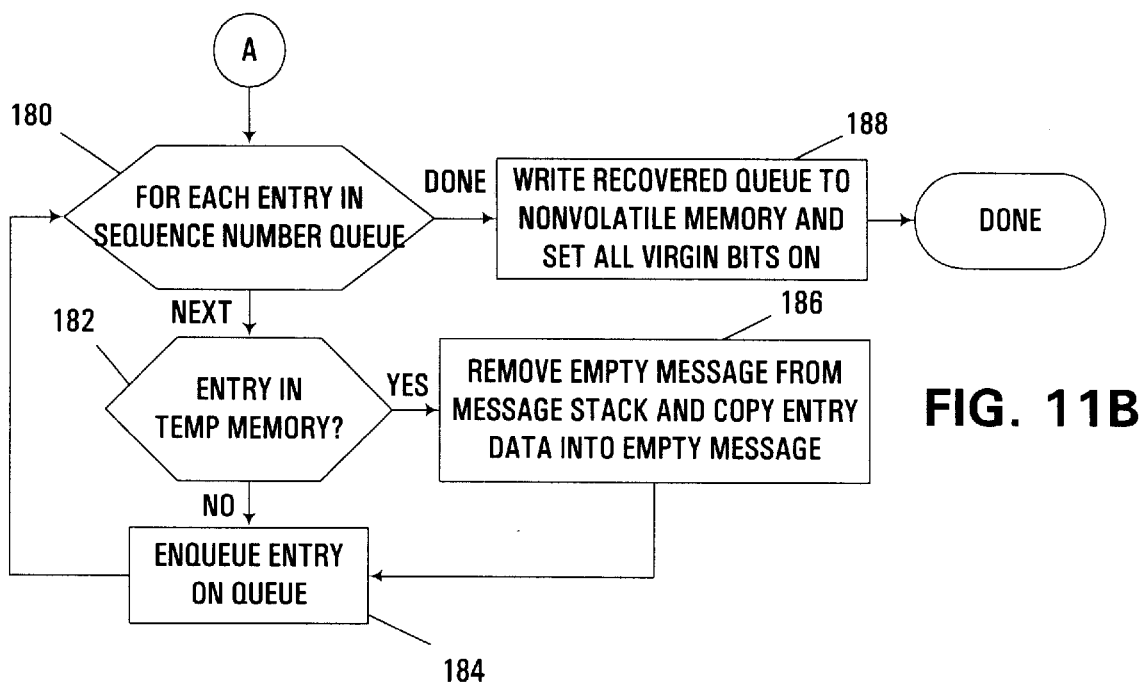

FIGS. 11A and 11B next illustrate the operations performed during recovery of the queue, via a recover queue routine 150. Routine 150 is typically executed during an initial program load (IPL) or other boot sequence that occurs subsequent to an abnormal termination encountered during the execution of computer 10.

Routine 150 is typically executed automatically upon restart of the computer as a part of the boot sequence to restore the computer to its previous state prior to the abnormal termination. In the alternative, routine 150 may be invoked manually by an application.

Routine 150 begins in block 152 by loading the last known state of the queue from non-volatile memory. Next, the virgin entries in the journal are written to the queue data structure—i.e., in the allocated memory therefor. Doing so results in valid sequence numbers, message data and keys for all of the messages that existed at the start of journaling or at the last time the entire contents of the queue were written to disk being retrieved into memory. However, at this point the pointers in the messages may not be trusted, and the virgin bits and anything in extends since journaling may be disregarded as irrelevant. As part of the execution of routine 150, the ordering of the queue is not restored, but is recreated based upon the contents of the journal, as will be more apparent from the discussion below.

Figure 12A:
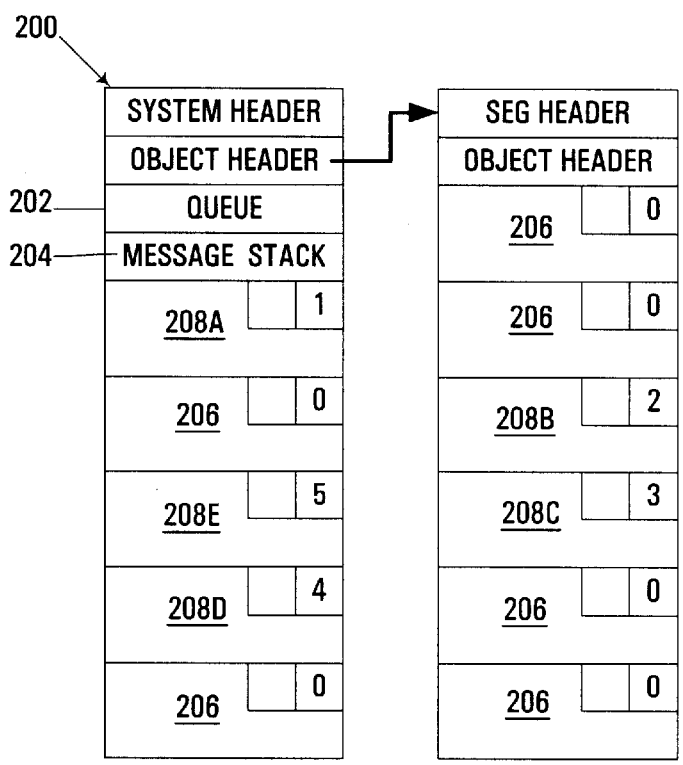
FIGS. 12A, 12B, 12C and 12D are block diagrams illustrating the recovery of the message queue of FIG. 10 at various stages during execution of the recover queue routine of FIGS. 11A and 11B.

FIG. 12A, for example, illustrates a result of the execution of blocks 152 and 154 when attempting to recover the exemplary data structure described above. Such data structure is now represented at 200 to represent that the recovered queue data structure may be stored at an alternate location in memory as the queue data structure is reallocated in the memory. The queue pointer 202 and message stack pointer 204 are at this point unused; however, the empty message records (now referenced at 206) from the message stack and the active message records (now referenced at 208A–208E) from the message queue as of the time of the last sync point are stored in the data structure 200 at the same relative locations as of the last sync point.

Returning to FIG. 11A, after completion of block 154, control passes to block 156 to create a new message stack and a sequence number queue. The new message stack utilizes the message stack pointer from the message queue data structure. However, the sequence number queue differs from the message queue in that the sequence number queue is headed by a separate pointer, and is sorted in order by sequence number rather than by key for message queues implemented in non-linked list data structures. It will be appreciated that for a linked-list data structure, the sequence number queue will be ordered in a similar manner to the message queue.

Next, block 158 initiates a FOR loop to process each message in the allocated memory for the message data structure up to the maximum number of messages specified at the last journal sync point. For each such message, control passes to block 160 to determine whether the message is active—that is, whether the message has a non-zero sequence number stored therein. If so, control passes to block 162 to enqueue the message on the sequence number queue. Each time that the message is enqueued onto the message queue, the sequence number is utilized to sort the queue to ensure that the messages are placed in order by sequence number. Control then returns to block 158 to process additional messages in memory.

If the message is not an active message, i.e., the message has a "0" sequence number, control passes from block 160 to block 164 to put the message on the message stack. In addition, any remaining messages and extends since the last sync point (i.e., any messages stored in additional memory that was allocated after the sync point) may also be placed on the message stack at this time. Upon completion of block 164, control passes back to block 158 to process additional messages.

Figure 12B:
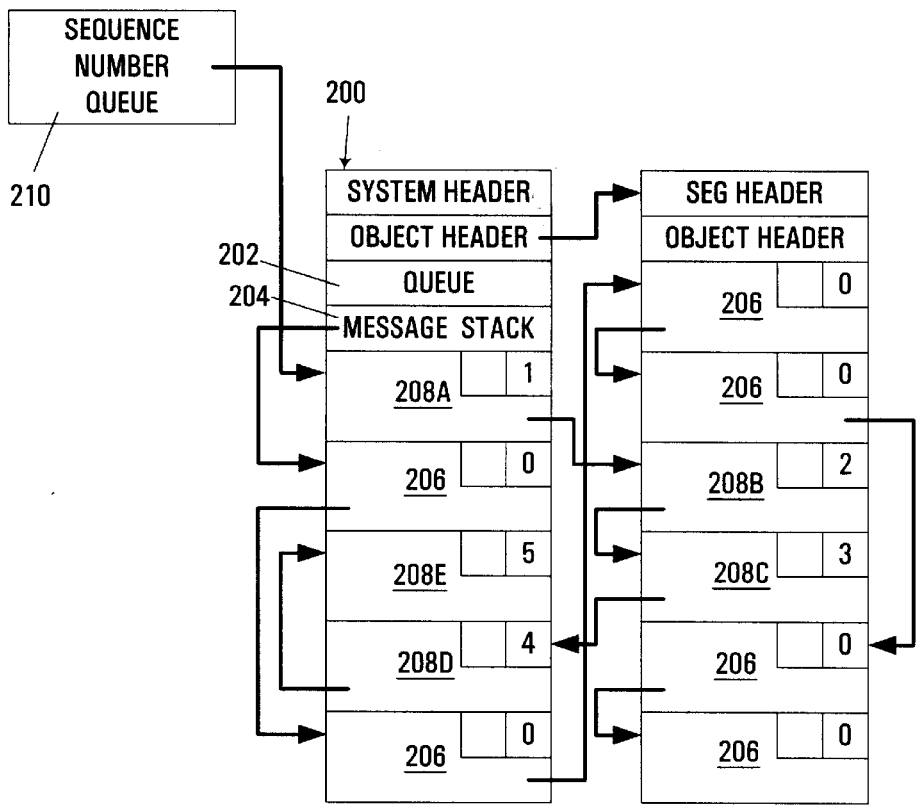

FIG. 12B illustrates the result of the execution of blocks 156–164 on the exemplary data structure 200. As may be seen from the figure, message stack pointer 204 points to a stack of empty message records 206. In addition, a sequence number queue, headed by pointer 210, is created, providing a linked list of message records 208A–208E sorted by sequence number.

Returning to FIG. 11A, once each message in memory has been processed, block 158 passes control to block 166 to process each enqueue and dequeue entry in the journal. For each such entry, control passes to block 168 to locate the sequence number specified in the entry in the sequence number queue. Next, block 169 determines whether the sequence number was found in the sequence number queue. If so, control passes to block 170 to remove the entry from the sequence number queue. Block 172 next determines whether the entry removed from the sequence number queue was in temp storage. If so, control returns to block 166 to process additional journal entries. If not, control instead passes to block 174 to first put the removed entry onto the message stack. Control then returns to block 166 to process additional entries.

Returning to block 169, if a matching entry is not found in the sequence number queue, control passes to block 176 to determine whether the journal entry is an enqueue entry. If it is, control passes to block 178 to allocate storage for the entry in a temporary memory, with the newly allocated entry populated with the message information stored in the enqueue entry. In addition, the new entry is enqueued on the sequence number queue based upon its sequence number. Control then returns to block 166 to process additional entries.

Returning to block 176, if the entry is not an enqueue entry, but rather is a dequeue entry, control passes to block 179 to add a place holder entry to the sequence number queue, with the anticipation that a later enqueue entry will be found that enqueues the message on the queue. Control then returns to block 166 to process additional entries in the journal.

It will be appreciated that, if additional queue operations are supported, additional types of journal entries may be created and processed in the loop initiated in block 166. For example, dequeue operations may specify a condition such that any messages that meet that condition are dequeued. Accordingly, such condition may be utilized to dequeue more entries from the sequence number queue as appropriate. In addition, a message queue may support a clear operation whereby all of the entries, or a select keyed number of entries, are removed from the sequence number queue in response to a journal entry representing the same.

It will also be appreciated that, if enqueuing of an entry on the sequence number queue exceeds the allocated storage space for the data structure, an extend may be required. It is anticipated that routine 150 may automatically allocate addition storage for extra entries as necessary.

Figure 12C:
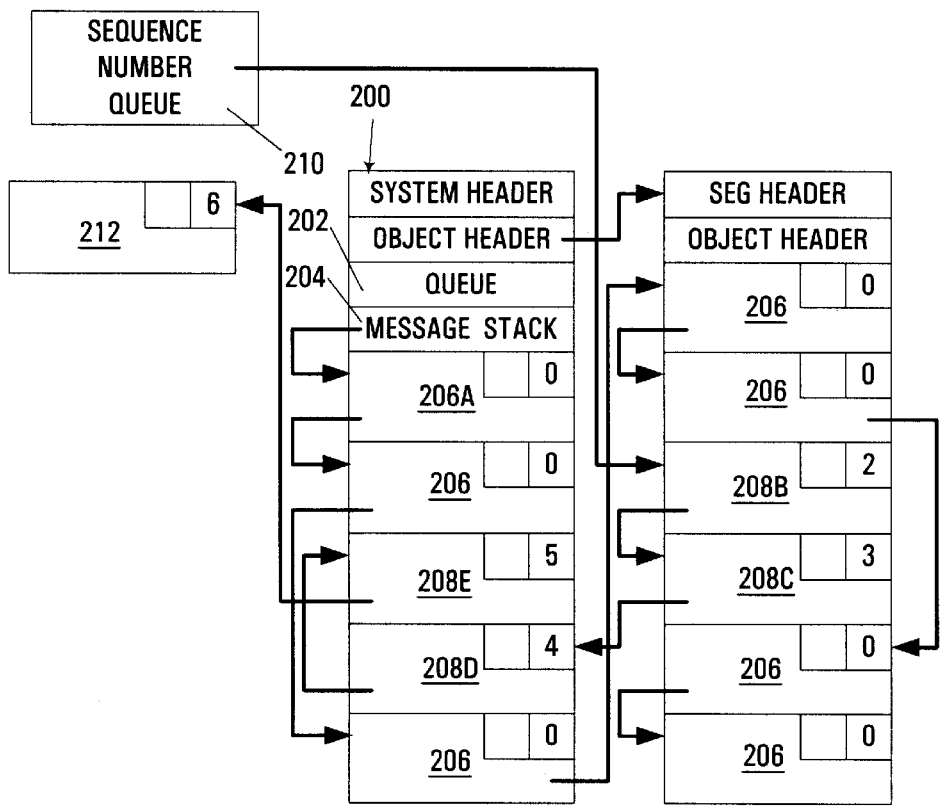

FIG. 12C illustrates the result of the loop initiated in block 166 of routine 150 on the exemplary data structure 200. It may be seen, in particular, that the enqueue entry added as a result of execution of routine 110 as described above, results in generation of a new message 212 in temporary storage, which is appended to the end of the sequence number queue subsequent to message 208E. In addition, message 208A at the head of the sequence number queue has been dequeued and placed at the head of the message stack as represented at 206A, in response to the dequeue entry added as a result of execution of routine 130 above.

Returning to FIG. 11A, upon the completion of the loop initiated in block 166, control passes to block 180 of FIG. 11B to initiate another loop during which the message queue is rebuilt. In particular, block 180 initiates a loop to process each entry in the sequence number queue. For each such entry, control passes to block 182 to determine whether the entry is disposed in temporary memory. Assuming first that the entry is not disposed in temporary memory, control passes to block 184 to simply enqueue the entry onto the message queue as appropriate for the particular data structure utilized for the message queue. Control then returns to block 180 to process additional entries in the sequence number queue.

If, however, the entry is disposed in temporary memory, block 182 instead passes control to block 186 to remove an empty message from the message stack and copy the entry from temporary memory into the empty message. Control then passes to block 184 to enqueue the message removed from the message stack onto the message queue as appropriate for the message queue data structure. Control then returns to block 180 to process additional entries in the sequence number queue. Once every such entry has been processed, block 180 passes control to block 188 to write the recovered queue out to nonvolatile memory and set all of the virgin bits to one. Routine 150 is complete, and the message queue has been fully recovered to the state the queue existed at the time of the abnormal termination.

Figure 12D:
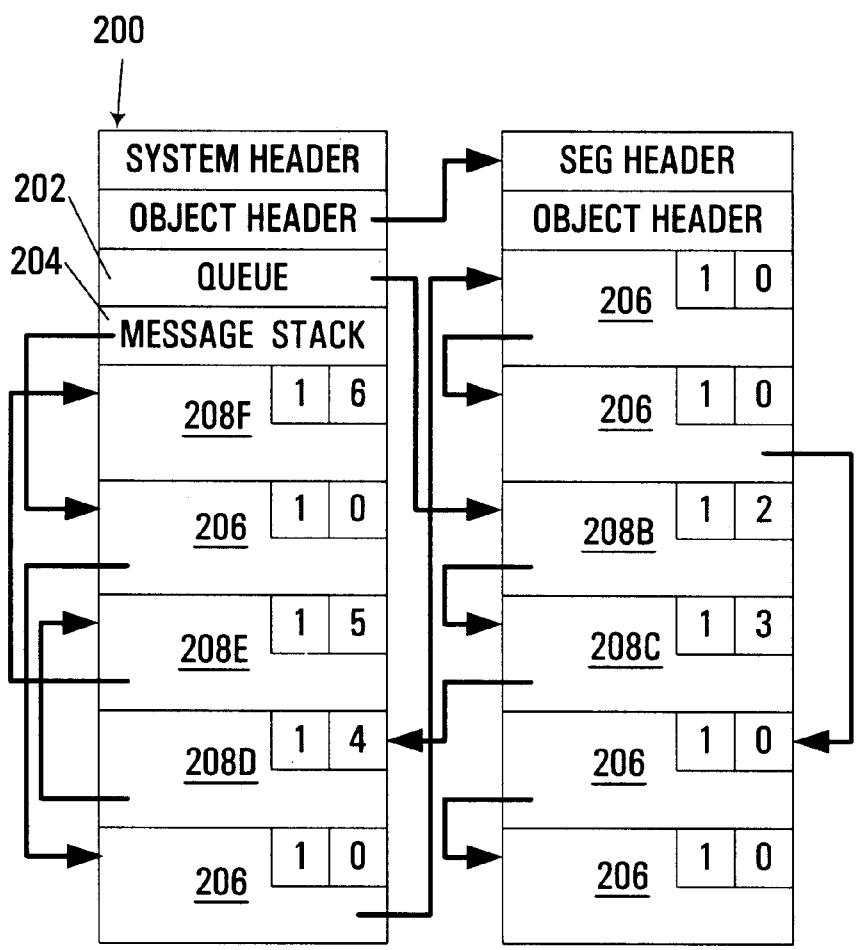

FIG. 12D illustrates the result of the enqueuing of each entry from the sequence number queue onto the message queue in exemplary data structure 200. Specifically, messages 208B–208E are enqueued onto the message queue pointed to by queue pointer 202. In addition, message 212 stored in temporary memory (FIG. 12C) is copied into the top message 206 on the message stack, resulting in a message 208F appended at the end of the message queue. In addition, with the queue written out to nonvolatile memory, all virgin bits are set to one. It is to be noted that as compared to the last state of the message queue as represented in FIG. 10, the actual ordering of the messages in memory may not be identical once the queue is recovered. However, the logical representations of the queue and the messages therein are essentially the same, i.e., the ordering and content of the messages on the message queue are identical.

Various modifications will be apparent to one of ordinary skill in the art. Therefore, the invention lies in the claims hereinafter appended.

What is claimed is:

1. A method of managing a queue in a computer, the method comprising:
   (a) storing a persistent representation of a queue in nonvolatile memory;
   (b) journaling at least one logical operation performed on the queue subsequent to storing the persistent representation of the queue; and
   (c) recovering the queue by retrieving the persistent representation of the queue from nonvolatile memory and applying the journaled logical operation to the queue;

wherein journaling the logical operation performed on the queue includes storing in a journal only logical operations that modify the logical organization of elements on the queue and logical operations that modify the logical contents of elements in the queue.

2. The method of claim 1, wherein the logical operation includes an enqueue operation that enqueues a new element onto the queue.

3. The method of claim 1, wherein the logical operation includes a dequeue operation that dequeues an element from the queue.

4. The method of claim 1, wherein recovering the queue is performed during a boot sequence subsequent to an abnormal termination on the computer.

5. The method of claim 1, wherein the queue comprises a message queue that stores a plurality of messages for use in performing inter-process communication in the computer.

6. The method of claim 5, wherein each message includes a sequence identifier, the method further comprising assigning sequence identifiers to the plurality of messages based upon an order in which such messages are enqueued on the message queue.

7. The method of claim 6, further comprising enqueuing a message on the queue by removing a message record from a message stack, copying message data into the message record, assigning a sequence identifier to the message record, and adding the message record to the message queue.

8. The method of claim 7, further comprising dequeuing a message record from the queue by removing a message record from the queue, resetting the sequence identifier for the message record and adding the message record to the message stack.

9. The method of claim 6, wherein recovering the queue further includes:
   (a) generating a sequence queue by ordering the messages stored in the persistent representation of the queue by sequence identifier; and
   (b) rebuilding the message queue by enqueuing the messages stored in the sequence queue onto the message queue.

10. The method of claim 9, wherein applying the journaled logical operation to the queue includes applying the journaled logical operation to a message on the sequence queue prior to rebuilding the message queue.

11. The method of claim 1, wherein the queue includes a plurality of elements disposed in a linked-list data structure.

12. The method of claim 1, wherein the queue includes a plurality of elements disposed in a keyed data structure, each element having a key associated therewith.

13. An apparatus, comprising:
   (a) a memory having a queue resident therein; and
   (b) a program configured to manage the queue by storing a persistent representation of the queue in nonvolatile memory, journaling at least one logical operation performed on the queue subsequent to storing the persistent representation of the queue, and recovering the queue by retrieving the persistent representation of the queue from nonvolatile memory and applying the journaled logical operation to the queue, wherein the program is configured to journal the logical operation performed on the queue by storing in a journal only logical operations that modify the logical organization of elements on the queue and logical operations that modify the logical contents of elements in the queue.

14. The apparatus of claim 13, wherein the logical operation includes an enqueue operation that enqueues a new element onto the queue.

15. The apparatus of claim 13, wherein the logical operation includes a dequeue operation that dequeues an element from the queue.

16. The apparatus of claim 13, wherein the program is configured to recover the queue during a boot sequence subsequent to an abnormal termination on the apparatus.

17. The apparatus of claim 13, wherein the queue comprises a message queue that stores a plurality of messages for use in performing inter-process communication in the apparatus.

18. The apparatus of claim 17, wherein each message includes a sequence identifier, the program further configured to assign sequence identifiers to the plurality of messages based upon an order in which such messages are enqueued on the message queue.

19. The apparatus of claim 18, wherein the program is further configured to enqueue a message on the queue by removing a message record from a message stack, copying message data into the message record, assigning a sequence identifier to the message record, and adding the message record to the message queue.

20. The apparatus of claim 19, wherein the program is further configured to dequeue a message record from the queue by removing a message record from the queue, resetting the sequence identifier for the message record and adding the message record to the message stack.

21. The apparatus of claim 18, wherein the program is configured to recover the queue further by generating a sequence queue by ordering the messages stored in the persistent representation of the queue by sequence identifier, and rebuilding the message queue by enqueuing the messages stored in the sequence queue onto the message queue.

22. The apparatus of claim 21, wherein the program is configured to apply the journaled logical operation to the queue by applying the journaled logical operation to a message on the sequence queue prior to rebuilding the message queue.

23. The apparatus of claim 13, wherein the queue includes a plurality of elements disposed in a linked-list data structure.

24. The apparatus of claim 13, wherein the queue includes a plurality of elements disposed in a keyed data structure, each element having a key associated therewith.

25. A program product, comprising:
(a) a program configured to manage a queue by storing a persistent representation of the queue in nonvolatile memory, journaling at least one logical operation performed on the queue subsequent to storing the persistent representation of the queue, and recovering the queue by retrieving the persistent representation of the queue from nonvolatile memory and applying the journaled logical operation to the queue, wherein the program is configured to journal the logical operation performed on the queue by storing in a journal only logical operations that modify the logical organization of elements on the queue and logical operations that modify the logical contents of elements in the queue; and
(b) a signal bearing medium bearing the program.

26. The program product of claim 25, wherein the signal bearing medium includes at least one of a recordable medium and a transmission medium.

27. A method of managing a message queue in a computer, the method comprising:
(a) storing a persistent representation of a message queue in nonvolatile memory, wherein the message queue stores a plurality of messages, and wherein each message includes a sequence identifier;
(b) assigning sequence identifiers to the plurality of messages based upon an order in which such messages are enqueued on the message queue;
(c) journaling at least one logical operation performed on the message queue subsequent to storing the persistent representation of the message queue; and
(d) recovering the message queue by retrieving the persistent representation of the message queue from nonvolatile memory and applying the journaled logical operation to the message queue, wherein recovering the message queue further includes generating a sequence queue by ordering the messages stored in the persistent representation of the queue by sequence identifier, and rebuilding the message queue by enqueuing the messages stored in the sequence queue onto the message queue.

28. The method of claim 27, wherein journaling the logical operation performed on the queue includes storing in a journal only logical operations that modify the logical organization of elements on the queue and logical operations that modify the logical contents of elements in the queue.

29. An apparatus, comprising:
(a) a memory having a message queue resident therein, wherein the message queue stores a plurality of messages, and wherein each message includes a sequence identifier; and
(b) a program configured to manage the queue by storing a persistent representation of the queue in nonvolatile memory, journaling at least one logical operation performed on the queue subsequent to storing the persistent representation of the queue, and recovering the queue by retrieving the persistent representation of the queue from nonvolatile memory and applying the journaled logical operation to the queue, wherein the is further configured to assign sequence identifiers to the plurality of messages based upon an order in which such messages are enqueued on the message queue, and wherein the program is configured to recover the queue further by generating a sequence queue by ordering the messages stored in the persistent representation of the queue by sequence identifier, and rebuilding the message queue by enqueuing the messages stored in the sequence queue onto the message queue.

30. The apparatus of claim 29, wherein the program is configured to journal the logical operation performed on the queue by storing in a journal only logical operations that modify the logical organization of elements on the queue and logical operations that modify the logical contents of elements in the queue.

* * * * *